US009127734B2

(12) United States Patent
Hanna et al.

(10) Patent No.: US 9,127,734 B2
(45) Date of Patent: Sep. 8, 2015

(54) BRAKE ROTOR WITH INTERMEDIATE PORTION

(75) Inventors: Michael D. Hanna, West Bloomfield, MI (US); Richard M. Kleber, Clarkston, MI (US); Ronnie T. Brown, Bloomfield Hills, MI (US); Charon L Morgan, Orion Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1652 days.

(21) Appl. No.: 12/420,259

(22) Filed: Apr. 8, 2009

(65) Prior Publication Data

US 2010/0258394 A1  Oct. 14, 2010

(51) Int. Cl.
*F16D 65/847*   (2006.01)
*F16D 65/12*   (2006.01)
*F16D 65/02*   (2006.01)

(52) U.S. Cl.
CPC .............. *F16D 65/12* (2013.01); *F16D 65/847* (2013.01); *F16D 2065/1316* (2013.01); *F16D 2065/1332* (2013.01); *F16D 2065/1344* (2013.01); *F16D 2200/003* (2013.01); *F16D 2200/0013* (2013.01); *F16D 2200/0021* (2013.01); *F16D 2250/0015* (2013.01); *F16D 2250/0046* (2013.01); *F16D 2250/0053* (2013.01); *Y10T 29/49481* (2015.01)

(58) Field of Classification Search
CPC ... F16D 65/128; F16D 65/847; F16D 65/827; F16D 2065/788; F16D 2065/1328
USPC .................. 188/218 XL, 264 A, 264 R, 18 A
See application file for complete search history.

(56) References Cited

U.S. PATENT DOCUMENTS

| 1,989,211 | A | | 1/1935 | Norton |
| 2,410,195 | A | * | 10/1946 | Baselt et al. ............... 188/218 R |
| 2,411,067 | A | * | 11/1946 | Tack ........................ 188/218 XL |
| 2,603,316 | A | | 7/1952 | Pierce |
| 2,800,982 | A | * | 7/1957 | Cottrell ..................... 188/218 R |
| 3,085,391 | A | | 4/1963 | Hatfield et al. |
| 3,147,828 | A | | 9/1964 | Hunsaker |
| 3,292,746 | A | | 12/1966 | Robinette |

(Continued)

FOREIGN PATENT DOCUMENTS

| CN | 1757948 A | 4/2006 |
| DE | 1230274 B | 12/1966 |

(Continued)

OTHER PUBLICATIONS

PCT/US2006/029687 Search Report and Written Opinion; PCT/ISA/210 & PCT/ISA/237; Mailed Apr. 2, 2007; 6 pages.

(Continued)

*Primary Examiner* — Vishal Sahni
(74) *Attorney, Agent, or Firm* — BrooksGroup

(57) ABSTRACT

One exemplary embodiment of a brake rotor includes a cheek member, an intermediate portion, and a hub member. The intermediate portion may be located between the cheek and hub members, and may extend from either the cheek member or the hub member. The intermediate portion may have an exposed section with multiple openings located in the exposed section. The intermediate portion may also have multiple blades extending from inner surfaces of all or some of the openings. The blades cause airflow to pass through the openings to cool the intermediate portion.

20 Claims, 2 Drawing Sheets

(56) References Cited

U.S. PATENT DOCUMENTS

| | | | |
|---|---|---|---|
| 3,378,115 A | 4/1968 | Stephens, III | |
| 3,425,523 A | 2/1969 | Robinette | |
| 3,475,634 A | 10/1969 | Bogdanov et al. | |
| 3,509,973 A | 5/1970 | Kimata | |
| 3,575,270 A | 4/1971 | Wagenfuhrer et al. | |
| 3,774,472 A | 11/1973 | Mitchell | |
| 3,841,448 A | 10/1974 | Norton, Jr. | |
| 3,975,894 A | 8/1976 | Suzuki | |
| 4,049,085 A | 9/1977 | Blunier | |
| 4,072,219 A | 2/1978 | Hahm et al. | |
| 4,250,950 A | 2/1981 | Buxmann et al. | |
| 4,281,745 A | 8/1981 | Wirth | |
| 4,379,501 A | 4/1983 | Hagiwara et al. | |
| 4,523,666 A | 6/1985 | Murray | |
| 4,905,299 A | 2/1990 | Ferraiuolo et al. | |
| 5,004,078 A | 4/1991 | Oono et al. | |
| 5,005,676 A | 4/1991 | Gassiat | |
| 5,025,547 A | 6/1991 | Sheu et al. | |
| 5,083,643 A | 1/1992 | Hummel et al. | |
| 5,115,891 A | 5/1992 | Raitzer et al. | |
| 5,139,117 A | 8/1992 | Melinat | |
| 5,143,184 A | 9/1992 | Snyder et al. | |
| 5,183,632 A | 2/1993 | Kiuchi et al. | |
| 5,259,486 A | 11/1993 | Deane | |
| 5,310,025 A | 5/1994 | Anderson | |
| 5,416,962 A | 5/1995 | Passarella | |
| 5,417,313 A | 5/1995 | Matsuzaki et al. | |
| 5,509,510 A | 4/1996 | Ihm | |
| 5,539,213 A | 7/1996 | Meeks et al. | |
| 5,582,231 A | 12/1996 | Siak et al. | |
| 5,620,042 A | 4/1997 | Ihm | |
| 5,660,251 A | 8/1997 | Nishizawa et al. | |
| 5,789,066 A | 8/1998 | De Mare et al. | |
| 5,819,882 A | 10/1998 | Reynolds et al. | |
| 5,855,257 A * | 1/1999 | Wickert et al. | 188/218 XL |
| 5,862,892 A | 1/1999 | Conley | |
| 5,878,843 A | 3/1999 | Saum | |
| 5,927,447 A | 7/1999 | Dickerson | |
| 6,047,794 A | 4/2000 | Nishizawa | |
| 6,073,735 A | 6/2000 | Botsch et al. | |
| 6,206,150 B1 | 3/2001 | Hill | |
| 6,216,827 B1 | 4/2001 | Ichiba et al. | |
| 6,223,866 B1 | 5/2001 | Giacomazza | |
| 6,241,055 B1 | 6/2001 | Daudi | |
| 6,241,056 B1 | 6/2001 | Cullen et al. | |
| 6,283,258 B1 | 9/2001 | Chen et al. | |
| 6,302,246 B1 | 10/2001 | Naumann et al. | |
| 6,357,557 B1 | 3/2002 | Di Ponio | |
| 6,367,598 B1 | 4/2002 | Sporzynski | |
| 6,405,839 B1 | 6/2002 | Ballinger et al. | |
| 6,465,110 B1 | 10/2002 | Boss et al. | |
| 6,481,545 B1 | 11/2002 | Yano et al. | |
| 6,505,716 B1 | 1/2003 | Daudi et al. | |
| 6,507,716 B2 | 1/2003 | Nomura et al. | |
| 6,543,518 B1 | 4/2003 | Bend et al. | |
| 6,604,613 B2 * | 8/2003 | Burgoon et al. | 188/218 XL |
| 6,799,664 B1 | 10/2004 | Connolly | |
| 6,880,681 B2 | 4/2005 | Koizumi et al. | |
| 6,880,683 B1 * | 4/2005 | Miles | 188/218 XL |
| 6,890,218 B2 | 5/2005 | Patwardhan et al. | |
| 6,899,158 B2 | 5/2005 | Matuura et al. | |
| 6,913,124 B2 * | 7/2005 | Tanaka et al. | 188/218 XL |
| 6,932,917 B2 | 8/2005 | Golden et al. | |
| 7,066,235 B2 | 6/2006 | Huang | |
| 7,112,749 B2 | 9/2006 | DiPaola et al. | |
| 7,178,795 B2 | 2/2007 | Huprikar et al. | |
| 7,219,777 B2 * | 5/2007 | Lin | 188/218 XL |
| 7,293,755 B2 | 11/2007 | Miyahara et al. | |
| 7,380,645 B1 | 6/2008 | Ruiz | |
| 7,568,560 B2 | 8/2009 | Lin | |
| 7,594,568 B2 | 9/2009 | Hanna et al. | |
| 7,644,750 B2 | 1/2010 | Schroth et al. | |
| 7,775,332 B2 | 8/2010 | Hanna et al. | |
| 7,823,763 B2 | 11/2010 | Sachdev et al. | |
| 7,836,938 B2 | 11/2010 | Agarwal et al. | |
| 7,937,819 B2 | 5/2011 | Hanna et al. | |
| 7,938,378 B2 | 5/2011 | Hanna et al. | |
| 2002/0007928 A1 | 1/2002 | Guetlbauer et al. | |
| 2002/0084156 A1 | 7/2002 | Ballinger et al. | |
| 2002/0104721 A1 | 8/2002 | Schaus et al. | |
| 2003/0037999 A1 | 2/2003 | Tanaka et al. | |
| 2003/0127297 A1 | 7/2003 | Smith et al. | |
| 2003/0141154 A1 | 7/2003 | Rancourt et al. | |
| 2003/0213658 A1 | 11/2003 | Baba | |
| 2004/0031581 A1 | 2/2004 | Herreid et al. | |
| 2004/0045692 A1 | 3/2004 | Redemske | |
| 2004/0074712 A1 | 4/2004 | Quaglia et al. | |
| 2004/0084260 A1 | 5/2004 | Hoyte et al. | |
| 2004/0242363 A1 | 12/2004 | Kohno et al. | |
| 2005/0011628 A1 | 1/2005 | Frait et al. | |
| 2005/0150222 A1 | 7/2005 | Kalish et al. | |
| 2005/0183909 A1 | 8/2005 | Rau, III et al. | |
| 2005/0193976 A1 | 9/2005 | Suzuki et al. | |
| 2005/0263358 A1 * | 12/2005 | Zahdeh | 188/218 XL |
| 2006/0076200 A1 | 4/2006 | Dessouki et al. | |
| 2006/0243547 A1 | 11/2006 | Keller | |
| 2007/0056815 A1 | 3/2007 | Hanna et al. | |
| 2007/0062664 A1 | 3/2007 | Schroth et al. | |
| 2007/0062768 A1 | 3/2007 | Hanna et al. | |
| 2007/0119667 A1 | 5/2007 | Hanna et al. | |
| 2007/0142149 A1 | 6/2007 | Kleber | |
| 2007/0166425 A1 | 7/2007 | Utsugi | |
| 2007/0181390 A1 * | 8/2007 | Korm | 188/218 XL |
| 2009/0056134 A1 | 3/2009 | Kleber et al. | |
| 2010/0206674 A1 * | 8/2010 | Monsere et al. | 188/218 XL |

FOREIGN PATENT DOCUMENTS

| | | |
|---|---|---|
| DE | 19948009 C1 | 3/2001 |
| DE | 102005048258 A1 | 4/2006 |
| GB | 2328952 A | 3/1999 |
| JP | 54052576 U | 4/1979 |
| JP | 57140929 * | 8/1982 |
| JP | 57154533 A | 9/1982 |
| WO | 01/36836 A1 | 5/2001 |

OTHER PUBLICATIONS

U.S. Appl. No. 11/554,234, filed Oct. 30, 2006; Inventor: Michael D. Hanna.

U.S. Appl. No. 11/680,179, filed Feb. 28, 2007; Inventor: Jon T. Carter.

U.S. Appl. No. 11/780,679, filed Jul. 20, 2007; Inventor: Michael D. Hanna.

U.S. Appl. No. 11/858,596, filed Sep. 20, 2007; Inventor: Houchin Xia.

U.S. Appl. No. 11/926,798, filed Oct. 29, 2007; Inventor; Michael J. Walker.

U.S. Appl. No. 11/969,259, filed Jan. 4, 2008; Inventor: Jan H. Aase.

U.S. Appl. No. 12/025,967, filed Feb. 5, 2008; Inventor: James G. Schroth.

U.S. Appl. No. 12/105,411, filed Apr. 18, 2008; Inventor: Mark A. Golden.

U.S. Appl. No. 12/105,438, filed Apr. 18, 2008; Inventor: John C. Ulicny.

U.S. Appl. No. 12/165,729, filed Jul. 1, 2008; Inventor: Michael D. Hanna.

U.S. Appl. No. 12/165,731, filed Jul. 1, 2008; Inventor: Michael D. Hanna.

U.S. Appl. No. 12/174,163, filed Jul. 16, 2008; Inventor: Michael D. Hanna.

U.S. Appl. No. 12/174,223, filed Jul. 16, 2008; Inventor: Michael D. Hanna.

U.S. Appl. No. 12/174,320, filed Jul. 16, 2008; Inventor: Brent D. Lowe.

U.S. Appl. No. 12/183,104, filed Jul. 31, 2008; Inventor: Michael D. Hanna.

U.S. Appl. No. 12/187,872, filed Aug. 7, 2008; Inventor: Kenichi Kimura.

U.S. Appl. No. 12/272,164, filed Nov. 17, 2008; Inventor: Michael D. Hanna.

(56) References Cited

OTHER PUBLICATIONS

Anyalebechi, P.N.; Ungrooved Mold Surface Topography Effects on Cast Subsurface Microstructure, Material Processing Fundamentals, TMS, 2007, pp. 49-66.

Anayalebechi, P.N.; Undulatory Solid Shell Growth of Aluminum Alloy 3003 as a Function of the Wavelength of a Grooved Mold Surface Topography; Material Processing Fundamentals, TMS, 2007, pp. 31-45.

Chinese Patent Office First Office Action, Patent Application No. 200510113784.x, Date of Issue of OA: May 18, 2007; 41 pages.

Chinese Patent Office Second Office Action, Patent Application No. 200510113784.x, Date of Issue of OA: Feb. 15, 2008; 13 pages.

German Examination of Patent Application No. 10 2005 048 258.9; Dated Oct. 22, 2007, 8 pages.

Hector et al., Focused Engery Beam Work Roll Surface Texturing Science and Technology; Journal of Material Processing & Manufacturing Science, vol. 2—Jul. 1993 pp. 63-119.

Lee et al., Titanium Dioxide Nanotube Arrays Fabricated by Anodizing Processes, Journal of the Electrochemical Society, 153, (11) B499-B505 (2006).

Dessouki et al., Disc Break Squeal; Diagnosis and Prevention; Society of Automotive Engineers. Copyright (2007), 7 pages.

Sieber et al., Porous Tantalum Oxide Prepared by Electrochemical Anodic Oxidation; Journal of the Electrochemical Society, 152 (9) C639-C644 (2005).

Tanaka et al., In situ Measurement of the Diameter of Nanopores in Silicon During Anodization in Hydrofluoric Acid Solution; Journal of the Electrochemical Society, 151 (6) C439-C445 (2004).

Wu et al., A Study of Anodization Process During Pore Formation in Nanoporous Alumina Tempaltes; Journal of the Electrochemical Society, 154 (1) E8-E-12 (2007).

Yigit et al., Critical Wavelengths for Gap Nucleation in Solidification—Part 1: Theoretical Methodology; American Society of Mechanical Engineers; vol. 67, Mar. 2000, pp. 66-77.

Magnetorheological fluid/ Wikipedia article; http://en.wikipedia.org/wiki/Magnetorheological_fluid; 9 pages.

U.S. Appl. No. 10/961,813; Coulomb Friction Damped Disc Brake Rotor; filed Oct. 8, 2004; Inventor: Omar S. DessoukiS.

U.S. Appl. No. 11/440,893; Rotor Assembly and Method; filed May 25, 2006; Inventor: Michael D. Hanna.

U.S. Appl. No. 11/832,401; Damped Product With Insert and Method of Making the Same; filed Aug. 1, 2007; Inventor: Michael D. Hanna.

U.S. Appl. No. 11/848,732; Cast-In-Place Torsion Joint; filed Aug. 31, 2007; Inventor: Richard M. Kleber.

U.S. Appl. No. 12/183,104; Low Mass Multi-Piece Sound Dampened Article; filed Jul. 31, 2008; Inventor: Michael D. Hanna.

U.S. Appl. No. 12/209,457; Thermally Accommodating Interconnection for Cast-In-Place Components; filed Sep. 12, 2008; Inventor: Richard M. Kleber.

U.S. Appl. No. 12/789,841; Interconnection for Cast-In-Place Components; filed May 28, 2010; Inventor: Richard M. Kleber.

* cited by examiner

BRAKE ROTOR WITH INTERMEDIATE PORTION

TECHNICAL FIELD

The technical field generally relates to brake rotors and brake rotors having different members.

BACKGROUND

Vehicle brake systems often include brake rotors that are subject to frictional forces in order to slow or stop the associated vehicle. Brake rotors are commonly made of a unitary piece and out of a single material, and may be heavy.

SUMMARY OF EXEMPLARY EMBODIMENTS OF THE INVENTION

One exemplary embodiment includes a product which may include a brake rotor. The brake rotor may include a cheek member, an intermediate portion, and a hub member. The hub member may be joined to the cheek member and may be a distinct component from the cheek member. The intermediate portion may be located between the cheek member and the hub member. The intermediate portion may have an exposed section with multiple openings located therein. The intermediate portion may also have multiple blades extending from inner surfaces of some or all of the openings to cause airflow to pass through the openings and thus cool the intermediate portion.

Another exemplary embodiment includes a product which may include a brake rotor. The brake rotor may include a cheek member, an intermediate member, and a hub member. The intermediate member may be a distinct component from the cheek member. The intermediate member may have at least one first flange that may be joined to a portion of the cheek member. The intermediate member may have at least one second flange. The intermediate member may also have an exposed section that may be located between the first flange and the second flange. The exposed section may have a plurality of openings located therein. In one embodiment, airflow may pass through the openings to cool the intermediate member. The hub member may be a distinct component from the intermediate member. The hub member may have a portion joined to the second flange.

Another exemplary embodiment includes a method which may include providing an intermediate member of a brake rotor. The intermediate member may comprise a first material. The intermediate member may have at least one first flange and may have at least one second flange that may be located opposite the first flange. The intermediate member may also have an exposed section that may be located between the first and second flange. The exposed section may have more than one opening that may be located therein. In one embodiment, airflow may pass through the openings to cool the intermediate member. The method may also include joining a portion of a cheek member of the brake rotor to the first flange. The cheek member may comprise a second material that may be different than the first material. And the method may further comprise joining a portion of a hub member of the brake rotor to the second flange.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

The figures illustrate various embodiments of a brake rotor 10 that is used in an automotive braking system. The brake rotor 10 may be made of at least two separate and distinct primary components, namely a rim or cheek member 12 and a hub member 16. The brake rotor 10 may also include an intermediate portion 14, which may or may not be a separate and distinct component. If distinct, the intermediate portion 14 is called an intermediate member, and if not distinct, the intermediate portion may be a unitary extension of either the cheek member 12 or the hub member 16. The brake rotor 10 may weigh less than other brake rotors that are made of one-piece. As used herein, the terms axially, radially, and circumferentially refer to directions with respect to the generally circular and cylindrical shape of the brake rotor 10. Accordingly, the term "axially" refers to a direction generally parallel to an imaginary center axis of the cylindrical shape, the term "radially" refers to a direction generally along any one of the imaginary radii of the cylindrical shape, and the term "circumferentially" refers to a direction generally along any one of the imaginary circumferences of the cylindrical shape.

Figure 1:
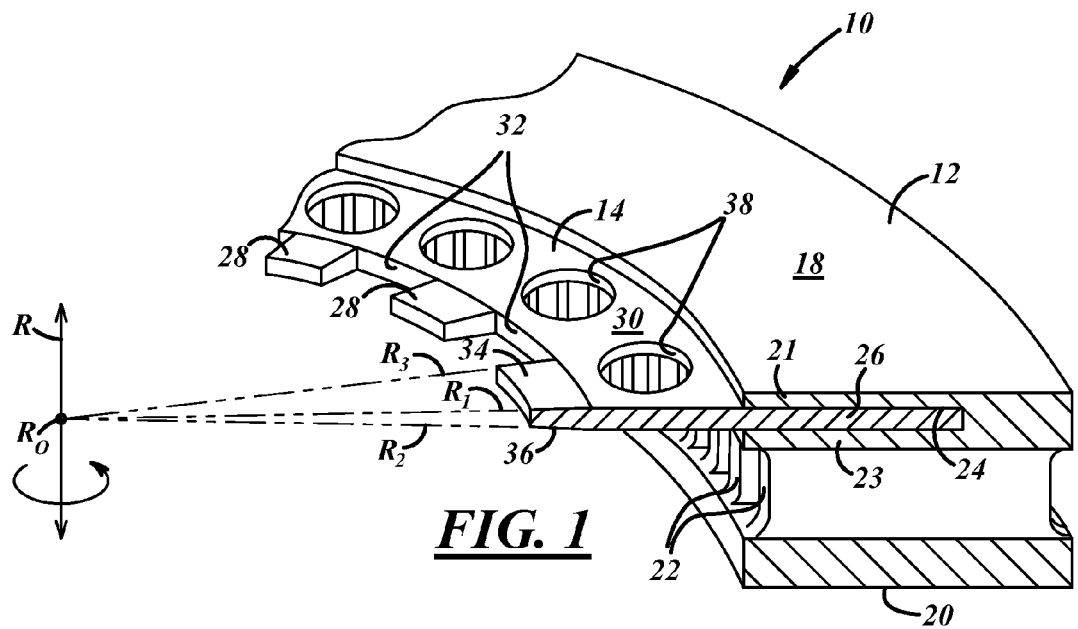
FIG. 1 is a sectional view of an embodiment of a cheek member and an embodiment of an intermediate member.

Referring to FIG. 1, the cheek member 12 may have a first cheek face 18 and an opposite second cheek face 20 that together constitute braking and friction surfaces of the brake rotor 10 that come into contact with a brake pad during a braking event. The cheek member 12 may be of the vented-type having a number of vanes 22 (FIGS. 1 and 2), may be of the solid-type with no vanes (FIGS. 3 and 4), or may be another type. In some embodiments, the cheek member 12 may be a two-piece assembly that is mechanically interconnected or otherwise joined together to the intermediate member 14 or to the hub member 16.

In select embodiments, the cheek member 12 is made out of a first material which may be a cast iron such as grey iron, may be a steel, or may be another suitable material. The cheek member 12 may be made by any one of, or a combination of, a number of metal forming processes including casting processes such as a pressure casting process, a forging process, a machining process, or another suitable process. In one example, a portion of the cheek member 12, such as an upper portion 21 and a lower portion 23, may be cast-over the intermediate member or portion 14. In another example, the cheek member 12 may be formed independently of the intermediate member 14 and may have a slot 24 in which the intermediate member is subsequently received and joined in. The first and second cheek faces 18, 20 may be heat-treated by a ferritic nitrocarburizing (FNC) process to improve the surface characteristics of the cheek faces, including wear and corrosion resistance. When formed independently of the intermediate member 14, the first and second cheek faces 18, 20 may be more easily heat-treated by the FNC process as compared to heat-treating the cheek faces when the cheek member 12 is joined with the intermediate member 14 and with the hub member 16, though this may be possible.

The intermediate member 14 may be a separate piece distinct from the cheek member 12 and from the hub member 16. In other words, the intermediate, cheek, and hub members 14, 12, 16 may not be one-piece. The intermediate member 14 may link the cheek and hub members 12, 16 and may withstand forces exerted on the cheek member during use, and may transmit some of those forces to the hub member. Still referring to FIG. 1, the intermediate member or portion 14 may have one or more first flange(s) 26, one or more second flange(s) 28, and an exposed section 30. The first flange(s) 26 may be circumferentially continuous around the exposed section 30, and may extend radially outwardly from the exposed section. The first flange(s) 26 may be cast-over and embedded in the cheek member 12 in a casting process to mechanically join the intermediate and cheek members, or may be otherwise received in the slot 24. In one embodiment, the first flange(s) 26 may be irregularly spaced with respect to one another, and one or more of the first flange(s) may have a different geometry than another one of the first flange(s).

The second flange(s) 28 may extend radially inwardly from the exposed section 30, and may be equally circumferentially spaced therearound to form spaces 32 separating neighboring second flanges. The second flange(s) 28 may be cast-over and embedded in the hub member 16 in a casting process to mechanically join the intermediate and hub members, or may be otherwise received in the hub member to join the members. In other embodiments, the first and second flange(s) 26, 28 may have different forms and configurations. For example, the first flange(s) 26 may have a plurality of separate and spaced apart flanges and the second flange(s) 28 may be a single circumferentially continuous flange, and each flange may have one or more hole(s) therein to permit material to flow therethrough and solidify therein during a casting process in order to provide an additional mechanical joint.

In one embodiment, the second flange(s) 28 may, though need not, be designed to accommodate thermal expansion and contraction which may occur during use with fluctuations in temperature, while still maintaining an effective mechanical joint between the hub and intermediate members 16, 14. In other words, the design may compensate and provide space for variations in material types and sizes at the joint between the hub and intermediate members 16, 14, including variations in height, length, thickness, volume, and other dimensions. As shown in cross-section in FIG. 1, each of the second flange(s) 28 may have upper and lower surfaces 34, 36 that may be planar. Each of the second flange(s) 28 may taper in axial height toward an axis of rotation R about which the brake rotor 10 rotates during use. That is, each of the second flange(s) 28 may grow thinner toward its respective free end. The upper surface 34 and the lower surface 36 may be angled toward each other so that they intersect at an imaginary reference point $R_0$. The imaginary reference point $R_0$ may be defined by the perpendicular intersection of the axis of rotation R and an imaginary radial line which goes through an axial centerpoint of the second flange(s) 28. Put differently, an imaginary upper radial line $R_1$ lying along the upper surface 34 and an imaginary lower radial line $R_2$ lying along the lower surface 36 may converge at the reference point $R_0$.

Each of the second flange(s) 28 may also taper in circumferential thickness toward the axis of rotation R. Opposite side surfaces of each of the second flange(s) 28 may be angled toward each other so that they intersect at the reference point $R_0$. Put differently, the upper radial line $R_1$, which may lie along a first circumferential edge of the second flange(s) 28, may converge with an imaginary edge radial line $R_3$, which may lie along a second circumferential edge of the second flange(s), at the reference point $R_0$.

Figure 2:
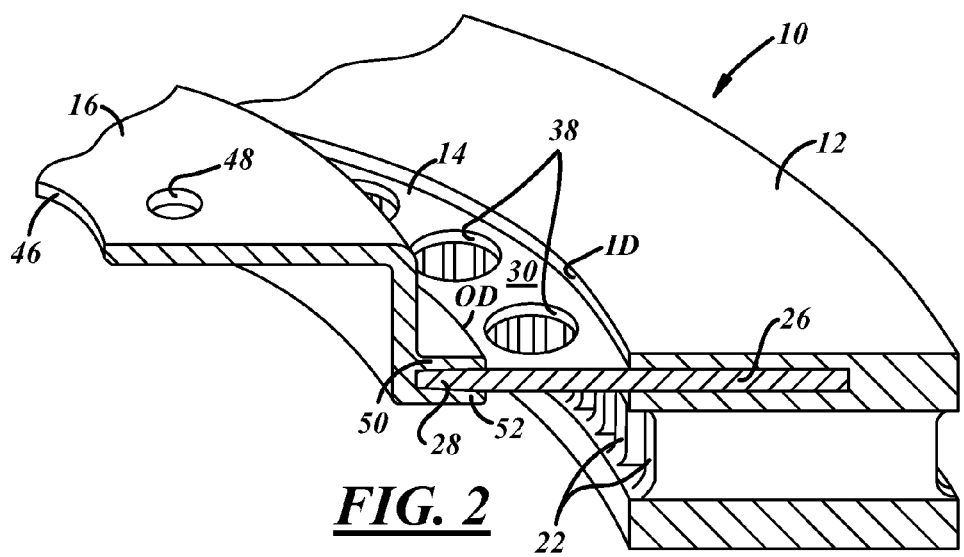
FIG. 2 is a sectional view of the cheek member and intermediate member of FIG. 1, and of an embodiment of a hub member.

The exposed section 30 may be a portion of the intermediate member or portion 14 that is not cast-over or otherwise not covered by the cheek member 12 or the hub member 16. When the brake rotor 10 is installed in an associated wheel assembly, the exposed section 30 may be viewed by an observer standing outside the associated vehicle, depending on an associated wheel cover. Referring to FIGS. 1 and 2, the exposed section 30 may extend between the first flange(s) 26 and the second flange(s) 28, and may extend between an inner diameter ID of the cheek member 12 and an outer diameter OD of the hub member 16. The exposed section 30 may have more than one opening(s) 38 located therein. In one embodiment the opening(s) 38 may be circumferentially spaced equally around the exposed section 30, or may be spaced in another pattern. The opening(s) 38 may have various sizes and shapes including circles, ovals, squares, and rectangles, to name but a few. In one embodiment, airflow may pass through the opening(s) 38 to help cool the intermediate member or portion 14.

Figure 3:
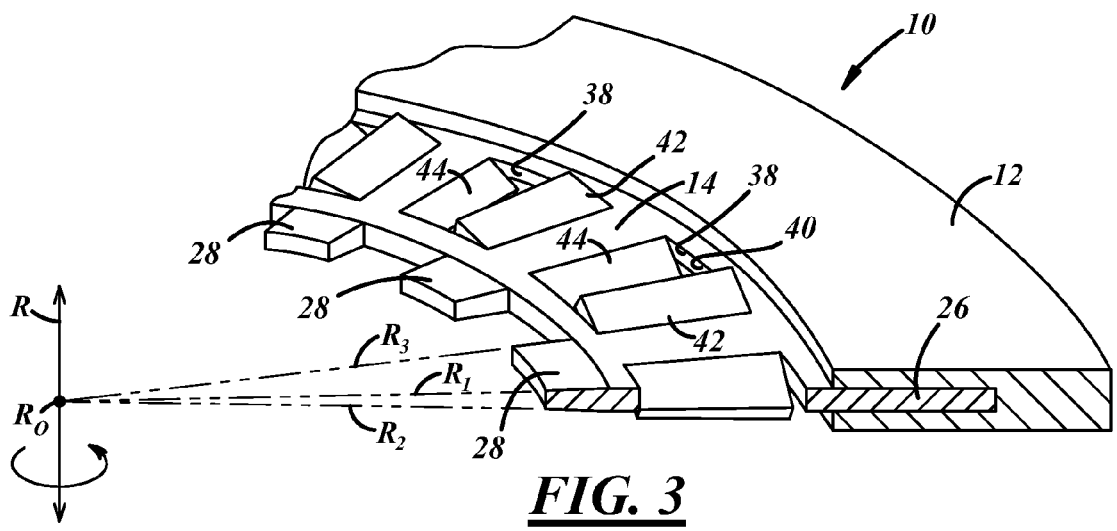
FIG. 3 is a sectional view of an embodiment of a cheek member and an embodiment of an intermediate member.
Figure 4:
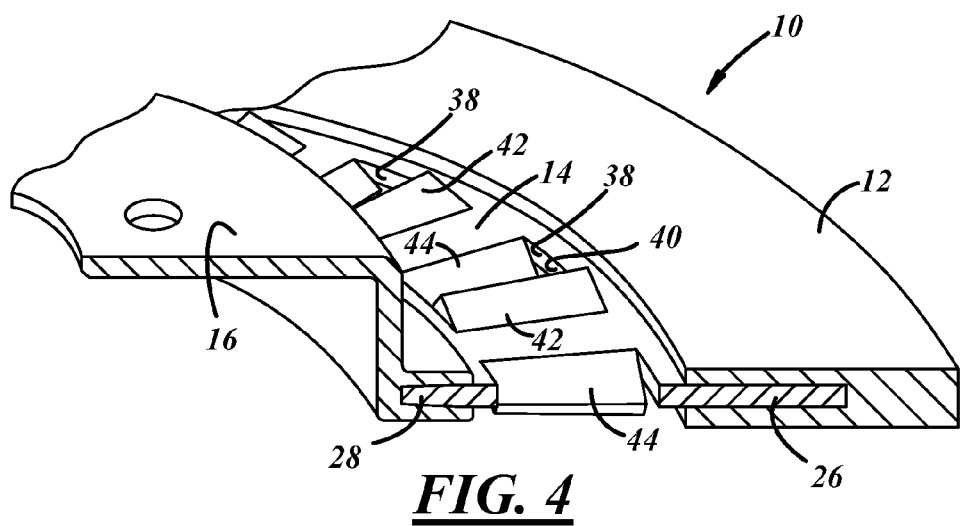
FIG. 4 is a sectional view of the cheek member and intermediate member of FIG. 3, and of an embodiment of a hub member.

Referring to FIGS. 3 and 4, in one embodiment the opening(s) 38 may be rectangular in shape, and may have an inner surface 40. A plurality of generally inwardly directed blades may extend from the inner surface 40. For example, a first blade 42 may be angled upward (with respect to the orientation of FIGS. 3 and 4), and a second blade 44 may be angled downward. The first and second blades 42, 44 may be rectangular in shape, and may have planar surfaces. The first and second blades 42, 44 may be angled opposite to each other, and may be oriented at an acute angle with respect to a planar top and bottom surface of the intermediate member or portion 14. In one embodiment, during use, the first and second blades 42, 44 may cause airflow to pass through the opening(s) 38 by drawing-in air as the brake rotor 10 rotates to help cool the intermediate member or portion 14. In other embodiments, each of the opening(s) 38 need not necessarily have a blade, only a single blade may extend from a single opening, the blades may have different shapes, and the blades may be oriented and angled differently than shown, to name but a few examples.

In select embodiments, the intermediate member 14 is made out of a second material which may include a steel such as a stainless steel, aluminum, titanium, or another suitable material. In some cases, the second material may be different than the first material. The intermediate member 14 may be made by any one of, or a combination of, a number of metalworking processes including casting processes such as a cast-in-place process or a pressure casting process, a forging process, a machining process, or another suitable process. Furthermore, in select embodiments, the intermediate member 14 may have various dimensions including, but not limited to, different radial lengths of the first and second flange(s) 26, 28, different radial lengths of the exposed section 30, and the axial height of the intermediate member may differ at different radial points therealong.

Referring to FIG. 2, the hub member 16 may be used to mount the brake rotor 10 to the associated automobile. The hub member 16 may have a central aperture 46 and a number of bolt holes 48.

In select embodiments, the hub member 16 is made out of a third material which may include aluminum such as an aluminum alloy 356, magnesium such as a magnesium alloy, titanium, or another suitable material. The third material may be a lighter material than the first material. The hub member 16 may be made by any one of, or a combination of, a number of metalworking processes including casting processes such as pressure casting, a forging process, a machining process, or another suitable process. In one example, a portion of the hub member 16, such as an upper portion 50 and a lower portion 52, may be cast-over the second flange(s) 28.

One exemplary embodiment of a method of making the brake rotor 10 may include a cast-in-place process whereby the intermediate member or portion 14 is cast-over by the cheek member 12 and/or by the hub member 16. The intermediate member 14 may be initially produced by one of the earlier-mentioned processes. The first and second flange(s) 26, 28, or select portions thereof, may be coated with a ceramic, or other suitable material, to help prevent a metallurgical bonding between the materials of the flange(s) and the materials of the cheek and hub members 12, 16 or to enhance frictional damping as will be subsequently described. The intermediate member 14 may then be placed, manually or automatically, in a cavity of a molding machine, and held therein. Once placed, opposing halves of the molding machine may be brought together under force and may be sealed together. One section of the resulting cavity may resemble the cheek member 12, and another section may resemble the hub member 16. The one section for the cheek member 12 may then be filled, such as by injection, with a molten material such as a molten iron, and the other section may be filled with a molten material such as a molten aluminum. Once solidified, the upper and lower portions 21, 23 of the cheek member 12 may envelop the first flange 26, and the upper and lower portions 50, 52 may envelop the second flanges 28.

In use, the brake rotor 10 may become heated. The heat generated by friction to the cheek member 12 may be conducted to the intermediate member or portion 14. Airflow passing through the opening(s) 38 may help dissipate the heat to cool the intermediate member or portion 14 and, in turn, the cheek member 12. In some cases, the heat dissipation resulting from the airflow through the opening(s) 38 may permit use of the solid-type cheek member 12, as opposed to the vane-type cheek member. The solid-type cheek member 12 may have a relatively light weight and a relatively reduced overall axial height as may be required for packaging of a hybrid or an electric automobile. The reduced overall axial height may also permit an increased overall radial length of the brake rotor 10, as may be desired in some cases.

Also when heated, the cheek member 12, the intermediate member or portion 14, and the hub member 16 may thermally expand. Though the cheek member 12 may become hotter in some cases, the material of the intermediate member or portion 14 and hub member 16 (e.g., aluminum, magnesium) may have a greater coefficient of thermal expansion and thus may expand to a similar extent or more than the cheek member 12. Conversely, after use and in cold weather, the cheek member 12, intermediate member or portion 14, and hub member 16 may become cooled and may thermally contract. In each instance, in one embodiment the geometry of the second flange(s) 28 may accommodate the expansion and contraction. Namely, the variously described tapers and associated imaginary lines crossing at the common reference point $R_O$ may permit expansion and contraction therealong. Moreover, depending on the materials selected for the members and/or portions, the respective thermal expansion and contraction amount may be minimized as compared to a brake rotor without the intermediate member or portion 14. In one example, the intermediate member 14 of stainless steel will expand and contract less than the hub member 16 of aluminum. Accordingly, the resulting variations in size at the joint between the intermediate member 14 and the cheek member 12 is less than may otherwise occur between the hub member 16 and the cheek member.

Furthermore, in some cases, the use of the intermediate member 14 may reduce or altogether eliminate galvanic corrosion that may otherwise be produced in brake rotors without the intermediate member 14 and with certain differing materials of the check and hub members 12, 16.

In select embodiments, the intermediate member or portion 14 may also help damp or otherwise dissipate vibrations and other oscillations that may occur in the brake rotor 10. This may help suppress sound and noise that may otherwise be emitted by the brake rotor 10 when the brake rotor is vibrated. When vibrated, relative sliding, movement, and other contact at an interface boundary formed respectively between the first flange(s) 26 and the cheek member 12, and the second flange(s) 28 and the hub member 16, or between particles of the coating and/or such particles and surfaces of the cheek, intermediate, or hub members, may generate friction and may absorb energy such as vibrations to consequently damp the vibrations.

In the example shown, the first flange(s) 26, the second flange(s) 28, or the opposing surfaces of the cheek member 12 and the hub member 16 may be coated to form a layer that facilities energy absorption between the intermediate member or portion 14 and the cheek and hub members, and thus helps damp vibrations. Suitable coatings may include, but are not limited to, a plurality of particles which may be bonded to each other and/or to the particular surface by an inorganic binder, an organic binder, or another suitable bonding material. Suitable binders may include, but are not limited to, epoxy resins, phosphoric acid binding agents, calcium aluminates, sodium silicates, wood flour, or clays. In one embodiment, the coating may be deposited on the particular surface as a liquid dispersed mixture of alumina-silicate-based, organically bonded refractory mix. In other embodiments, the coating may include at least one of alumina or silica particles, mixed with a lignosulfonate binder, cristobalite ($SiO_2$), quartz, or calcium lignosulfonate. The calcium lignosulfonate may serve as a binder. In one embodiment, the coating may include any type of coating used in coating casting ladles or vessels, such as IronKote or Ladlekote type coatings. In one embodiment, a liquid coating may be deposited on a portion of the particular surface, and may include high temperature Ladlekote 310B. In another embodiment, the coating may include at least one of clay, $Al_2O_3$, $SiO_2$, a graphite and clay mixture, silicon carbide, silicon nitride, cordierite (magnesium-iron-aluminum silicate), mullite (aluminum silicate), zirconia (zirconium oxide), or phyllosilicates. In one embodiment, the coating may comprise a fiber such as ceramic or mineral fibers.

Interface boundaries that may absorb energy and thus help damp vibrations may be formed with the coating and may include, but is not limited to: the inner surface of the slot 24 against the layer formed, the outer surface of the first flange(s) 26 against the layer formed, the inner surface of a slot formed in the hub member 16 against the layer formed, the outer surface of the second flange(s) 28 against the layer formed, the inner surface of the slot 24 against the particles or fibers, the outer surface of the first flange(s) 26 against the particles or fibers, the inner surface of the slot formed in the hub member 16 against the particles or fibers, the outer surface of the second flange(s) 28 against the particles or fibers, and movement of the particles or fibers against one another.

The exact thickness of the coating may vary and may be dictated by, among other things, the materials used for the intermediate member or portion 14 and the cheek and hub members 12, 16, and the desired degree of vibration damping. Examples of thicknesses may range from about 1 μm-400 μm, 10 μm-400 μm, 30 μm-300 μm, 30 μm-40 μm, 40 μm-100 μm, 100 μm-120 μm, 120 μm-200 μm, 200 μm-300 μm, 200 μm-550 μm, or variations of these ranges.

Some examples of suitable particles or fibers that may be a part of a particular coating may include, but is not limited to, silica, alumina, graphite with clay, silicon carbide, silicon nitride, cordierite(magnesium-iron-aluminum silicate), mullite(aluminum silicate), zirconia(zirconium oxide), phyllosilicates, or other particles that are stable at high temperatures. In one example, the particles may have a length as defined by the longest dimension in a range of about 1 μm-350 μm, or 10 μm-250 μm.

In an embodiment having a coating with particles, fibers, or both, the particles may have an irregular shape (e.g., not smooth) to augment vibration damping. The particles, fibers, or both, may be bonded to one another or to the opposing surfaces of the first flange(s) 26 and the cheek member 12, and that of the second flange(s) 28 and the hub member 16 because of, among other things, the inherent bonding properties of the particles or fibers. For example, the bonding properties of the particles or fibers may be such that the particles or fibers may bind to the immediately-above-mentioned surfaces under compression. In an example, the particles, fibers, or both, may be treated to provide a coating on the particles or fibers themselves, or to provide functional groups attached thereto to bind the particles together or attach the particles to at least one of the above-mentioned-surfaces. In another example, the particles, fibers, or both may be embedded in at least one of the above-mentioned-surfaces to augment vibration damping.

In another embodiment, the particles, the fibers, or both, may be temporarily held together, held to the above-mentioned-surfaces, or held to both, by a fully or partially sacrificial coating. The sacrificial coating may be consumed by molten metal or burnt off when material is cast-over the first and second flange(s) 26, 28. The particles, fibers, or both are left behind and trapped between the intermediate member or portion 14 and the cheek and hub members 12, 16 to provide a layer consisting of the particles, the fibers, or both.

In another embodiment, one or more of the above-mentioned-surfaces may include a relatively rough surface including a plurality of peaks and valleys to augment the frictional damping thereat. In this example, the above-mentioned-surfaces may be abraded by sandblasting, glass bead blasting, water jet blasting, chemical etching, machining, or any other suitable process that may produce relatively rough surfaces.

In an embodiment where the first and second flange(s) 26, 28 are cast-over by the respective cheek and hub members 12, 16, and the particles, fibers, or both may be exposed to the temperature of a molten material, the particles, the fibers, or all, may be made from materials that can resist flow and significant erosion during the casting process. For example, the particles, the fibers, or all, may be composed of refractory materials that can resist flow and erosion at temperatures above 1100° F., above 2400° F., or above 2700° F. In an example casting process, when molten material is poured, the particles, the fibers, or all, should not be wet by the molten material so that the molten material does not bond where an interface boundary would otherwise be formed. In another embodiment, the intermediate member or portion 14 may be cast into the cheek and/or hub member 12, 16.

In an embodiment where the brake rotor 10 is made using a process that subjects the intermediate member or portion 14, the particles, the fibers, or all, to relatively high temperatures associated with molten materials, the particles, the fibers, or all, may be made from a variety of materials including, but not limited to, non-refractory polymeric materials, ceramics, composites, wood, or other materials suitable for frictional damping.

In another embodiment, a wettable surface may be provided that does not include a layer with particles or fibers, or a wettable material such as graphite is provided over a section of the above-mentioned-surfaces, so that the cast material is bonded to the wettable surface in order to attach the above-mentioned-surfaces to one another while still permitting frictional damping on the non-bonded surfaces.

The above description of embodiments of the invention is merely exemplary in nature and, thus, variations thereof are not to be regarded as a departure from the spirit and scope of the invention.

What is claimed is:

1. A product comprising:
    a brake rotor comprising:
        a cheek member;
        a hub member joined to the cheek member; and
        an intermediate portion located between the cheek member and the hub member, the intermediate portion having an exposed section with a plurality of openings located therein, the plurality of openings being formed entirely by inner surfaces of the intermediate portion, and the intermediate portion having a plurality of blades extending from the inner surfaces of at least some of the openings to cause airflow to pass through the openings to cool the intermediate portion.

2. A product as set forth in claim 1 further comprising an intermediate member having the intermediate portion located thereon.

3. A product as set forth in claim 2 wherein the cheek member comprises a first material, the intermediate member comprises a second material which is different than the first material, and the hub member comprises a third material which is different than the first material.

4. A product as set forth claim 3 wherein the first material comprises a cast iron or a steel, the second material comprises a stainless steel, an aluminum, or a titanium, and the third material comprises an aluminum, a titanium, or a magnesium.

5. A product as set forth in claim 2 wherein the intermediate member has at least one first flange and at least one second flange, the cheek member being joined to the at least one first flange, and the hub member being joined to the at least one second flange.

6. A product as set forth in claim 5 wherein the cheek member has a portion being cast-over the at least one first flange to join the cheek member and intermediate member, the hub member has a portion being cast-over the at least one second flange to join the hub member and intermediate member, and wherein relative movement between the cheek, intermediate, and hub members damps vibrations in the brake rotor when the brake rotor is vibrated.

7. A product as set forth in claim 2 wherein the exposed section is located between an inner diameter of the cheek member and an outer diameter of the hub member.

8. A product as set forth in claim 1 wherein each opening has a pair of oppositely positioned blades of the plurality of blades, with one blade of the pair of oppositely positioned blades being angled upward and the other blade of the pair of oppositely positioned blades being angled downward.

9. A product as set forth in claim 1 wherein the cheek member is of the solid-type with no vanes.

10. A product as set forth in claim 1 wherein the cheek member has a first cheek face and a second cheek face contacting a brake pad during a braking event, the first and second cheek faces being treated by a ferritic nitrocarburizing process.

11. A product as set forth in claim 5 wherein each of the at least one second flange is tapered in axial height toward an axis of rotation of the brake rotor, and each of the at least one second flange is tapered in circumferential thickness toward the axis of rotation, and wherein thermal expansion and contraction between the intermediate member and the hub member during use of the brake rotor is accommodated by the at least one second flange.

12. A product comprising:
a brake rotor comprising:
a check member;
an intermediate member having at least one first flange joined to a portion of the cheek member and having a plurality of second flanges being circumferentially spaced apart from one another, at least some of the plurality of second flanges being tapered in axial height toward an axis of rotation of the brake rotor, at least some of the plurality of second flanges being taped in circumferential thickness toward the axis of rotation, the intermediate member also having an exposed section located between the at least one first flange and the plurality of second flanges, the exposed section having a plurality of openings located therein so that, in use, airflow passes through the openings to cool the intermediate member; and
a hub member having a portion joined to the plurality of second flanges;
wherein thermal expansion and contraction between the intermediate member and the hub member during use of the brake rotor is accommodated by the plurality of second flanges.

13. A product as set forth in claim 12 wherein the cheek member comprises a first material comprising a cast iron or a steel, the intermediate member comprises a second material comprising a stainless steel, an aluminum, or a titanium, and the hub member comprises a third material comprising an aluminum, a titanium, or a magnesium.

14. A product as set forth in claim 13 wherein the intermediate member has a plurality of blades extending from inner surfaces of at least some of the openings to cause airflow to pass through the openings to cool the intermediate member.

15. A product as set forth in claim 14 wherein each opening has a pair of oppositely positioned blades of the plurality of blades, with one blade of the pair of oppositely positioned blades being angled upward and the other blade of the pair of oppositely positioned blades being angled downward.

16. A product as set forth in claim 15 wherein the cheek member has a first cheek face and a second cheek face contacting a brake pad during a braking event, the first and second cheek faces being treated by a ferritic nitrocarburizing process.

17. The product of claim 12 wherein the first flange is in the radial direction.

18. A method of making a product, the method comprising:
providing an intermediate member of a brake rotor, the intermediate member comprising a first material and having at least one first flange and at least one second flange located opposite the first flange, the intermediate member also having an exposed section located between the at least one first flange and second flange, the exposed section having a plurality of openings located therein so that, in use, airflow passes through the plurality of openings to cool the intermediate member, the plurality of openings being formed entirely by inner surfaces of the intermediate member;
joining a portion of a cheek member of the brake rotor to the at least one first flange, the cheek member comprising a second material which is different than the first material; and
joining a portion of a hub member of the brake rotor to the at least one second flange.

19. A method as set forth in claim 18 wherein the intermediate member has a plurality of blades extending from the inner surfaces of at least some of the plurality of openings to cause airflow to pass through the plurality of openings to cool the intermediate member.

20. A method as set forth in claim 19 wherein the first material comprises a material selected to prevent galvanic corrosion between the hub member and the cheek member.

* * * * *